Patented Mar. 25, 1947

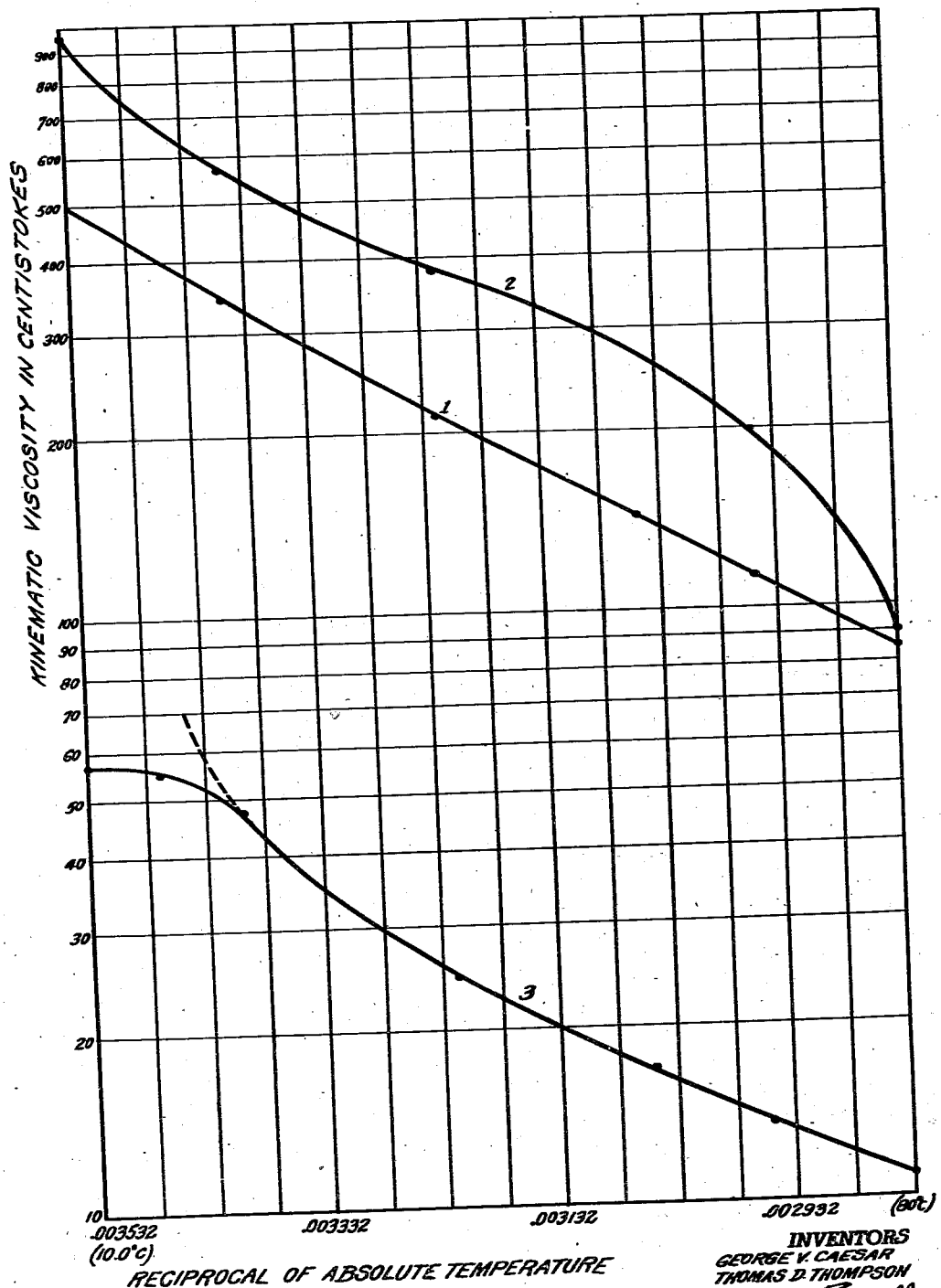

2,417,969

UNITED STATES PATENT OFFICE 2,417,969

DISSOCIATED STARCH AND METHOD OF MAKING THE SAME

George V. Caesar, Staten Island, N. Y., and Thomas D. Thompson, North Branch, N. J., assignors to Stein, Hall & Company, Inc., New York, N. Y., a corporation of New York Application December 15, 1941, Serial No. 423,046

9 Claims. (Cl. 127—32)

The present invention relates to a new starch product having unique characteristics with respect to its physical and chemical properties. The invention also resides in a method of mechanically treating starch to produce the new starch composition having improved properties, for example, with respect to viscous characteristics, structure, and film-forming properties.

The industrial use of aqueous dispersions of starch, familiarly but less correctly known as "starch solutions," is largely predicated upon a suitable degree of colloidal homogeneity and viscous flow at the solid concentrations desired. Starch dispersions are used for very many industrial purposes, chief among which are paper and textile sizing and coating, and adhesive usages. A tough homogeneous film is desired, and the aqueous dispersion from which such a film is deposited should preferably exhibit the maximum possible degree of viscous stability as a function of temperature and time.

Raw starch in its usual commercial form is insoluble in water but may be formed into a colloidal or semi-colloidal dispersion by forming a slurry with water and heating the starch slurry to an elevated temperature at which the starch granules swell or burst and thus become "gelatinized." The particular temperature required for gelatinization depends upon the particular starch selected and on other conditions maintained during the gelatinization. The properties of such gelatinized dispersions depend upon many factors such as temperature and concentration, and also upon the starch material itself and the manner in which the dispersion is prepared. It is to be expected that many attempts have been made heretofore to modify the properties of starch to enhance the usefulness of the material for the many above mentioned purposes.

Unfortunately, these desiderata of homogeneity, suitable viscosity range, and viscous stability have heretofore been difficult if not impossible to approximate using low cost raw, substantially unmodified starches. It has been necessary to modify raw starch through suitable chemical or enzymic treatments.

Among the expedients utilized to modify the characteristics of starch heretofore is the treatment of starch with various chemical reagents such as acids, alkalis and oxidizing compounds.

Such pretreatments bring about to a greater or less extent a degeneration or depolymerization of the starch structure, forming a fine-grained liquid structure when the processed starch is dispersed in water through cooking, accompanied more or less by mechanical agitation from stirring mechanisms, pumps, colloid mills, etc. For starches which may have been considerably degenerated by such pretreatments, comparatively little mechanical agitation may be employed. The extent to which mechanical means of dispersion may be used, depends upon individual mill equipment and practice.

Modification of the starch to make the same soluble in cold water has been unsuccessful in that some of the desirable properties of a conventional starch solution are destroyed. The art long has sought to prepare a starch product which is soluble in cold water and which at the same time has optimum characteristics with respect to viscosity and film-forming properties.

In accordance with the present invention, a new starch product may be prepared which is soluble in cold water, and solutions prepared therefrom exhibit improved characteristics, including, for example, an exceptionally low and stable viscosity as a function of temperature. Moreover, the product is of novel appearance and otherwise is particularly suitable for use in conventional textile and paper treating processes, as described more fully hereinafter.

The invention may be understood in connection with the drawings, in which:

Fig. 2 is a diagrammatic illustration of certain properties of the composition produced in accordance with the invention as compared with prior art compositions.

Figure 1:
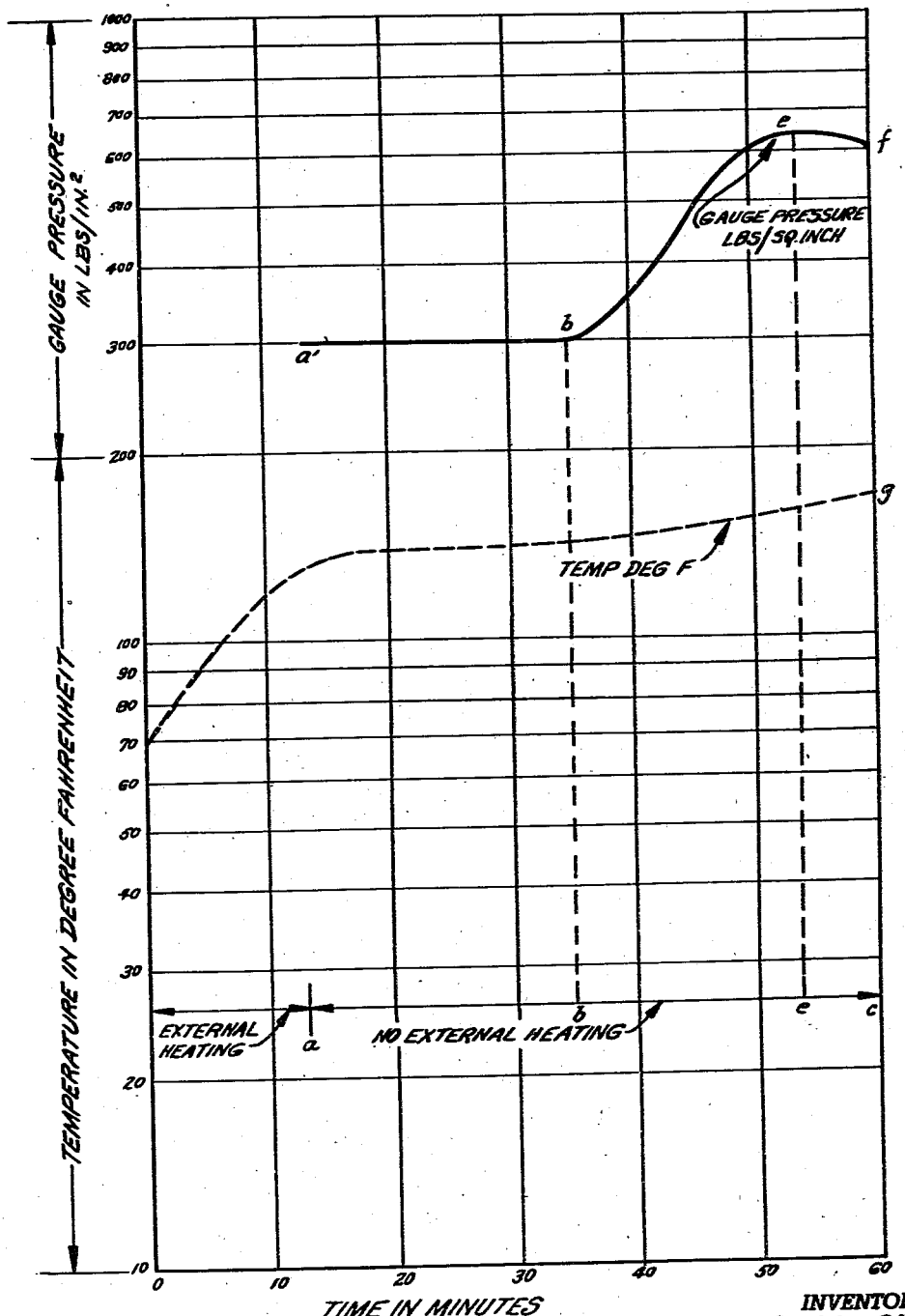
Fig. 1 is a diagrammatic illustration of a specific example of the process of practicing the invention.

We have referred previously to degeneration or depolymerization of starch structures, and before proceeding with a more detailed description of the invention, it is desirable to consider some of the considerations in starch chemistry. It is postulated that the starch molecules occur in relatively large aggregates that may be broken up into smaller ones. Such smaller aggregates differ in many respects depending on their structure and the manner in which they are formed. It has been assumed that the starch molecule is a curved chain of uncertain and perhaps variable length. See "The Starch Molecule," Caesar & Cushing, J. Phys. Chem. 45, 776 (1941). The chain is held together by primary valences. Chains are bonded together by means of secondary valences. The breaking down of the starch molecules so as to break down or decrease the length of the chains, (breaking the primary valences) is assumed to be one phenomenon and is termed degeneration or depolymerization; it is involved, for example, when starch is converted into dextrin. The breaking of the secondary valences to separate the chains is assumed to be another phenomenon and is termed dissociation or disorganization.

It is believed that the starch aggregates in the new product have been the subject of a major amount of dissociation or disorganization with a minimum amount of degeneration or depolymerization to provide starch aggregates of a new type having properties more resembling those of cellulose which is formed of linear molecules not so associated laterally. The electron microscope shows a relatively profound degree of dissociation in the product of our invention.

In accordance with the present invention a rapid and efficient mechanical disorganization or dissociation of the starch granular package, with minimum depolymerization or degeneration of the molecule, may be obtained when an aqueous suspension of the granules is sheared one against another by turbulent impact, during hydration or swelling.

The process of this invention comprising the physical treatment of starch while it is undergoing the above treatment may be accomplished by continuously circulating a starch "milk" of suspended granules under high pressure induced by a suitable pumping mechanism and to obtain a maximum turbulence by the use of a square or knife-edged orifice of variable dimensions, applying only enough external heating to carry the starch milk slowly through its gelatinization phase. In practice it was found that no external heating was required, the heat generated by the turbulent impacts of the granules being sufficient automatically to raise the temperature of the charge to any degree desired.

It was found to be unnecessary and in certain respects undesirable to carry the process very far beyond the peak pressure developed at the optimum area of orifice. The hydrostatic gauge pressures increase with time until a peak pressure at maximum gelatinization is obtained; after that the pressure falls rather slowly. Further processing is uneconomical, the energy being expended against elastic particles as in the case of ordinary homogenizing processes. Long continued heating and processing was found to yield definite evidences of degeneration.

The invention is to be distinguished from the mechanical treatment, such as "homogenizing," subsequent to gelatinization, which is not effective for obtaining the results of this invention.

In certain instances, raw starch aqueous dispersions have been drastically processed by homogenizing through pumps, injectors, colloid mills, etc., for prolonged periods at elevated temperatures; but substantially all of this mechanical energy has been expended upon the very elastic medium of substantially gelatinized starch granules and fragments of granules. It is exceedingly difficult and wasteful of energy to do useful work upon such an elastic medium, as the relatively inefficient results have proven. Dissociation of aqueous starch dispersions by these methods has not been commercially successful except for minor usages wherein processing costs were relatively unimportant. Nor have the products so obtained possessed to an equal degree the physical properties of film-forming toughness, viscous stability, and the freedom from excessive depolymerization or degeneration characteristic of the products of the process for which we claim invention.

Our process is also in contrast to a process of dry grinding or shearing of the starch granules, which develops a high degree of localized heat and degenerative influences.

In accordance with the present invention, a suspension or "milk" of raw starch is prepared at a concentration of the order of about 5 to 30% solids, preferably within the range of 10 to 20%. The milk, initially, is preheated, while under agitation to prevent settling, to a temperature preferably well below the gelatinizing temperature for the particular starch selected. It is advantageous to discontinue the preheating at a temperature of about 10° below the temperature at which gelatinization begins. For tapioca flour and potato starch, the slurry will be heated to about 120° to 130° F. The preheating may be carried out in any suitable fashion, for example, in the container in which the starch slurry is to be processed subsequently or in a separate container.

The processing container or kettle preferably contains a suitable agitator and is equipped to circulate the starch milk or slurry continuously by means of a suitably designed high pressure pump discharging through a suitable type of orifice back into the kettle. The orifice preferably should have sharp or square edges. This provides maximum turbulency as the slurry passes through and exits from the orifice. By this means the liquid mass in the processing kettle may be continuously circulated under high pressure through an orifice throughout the processing operation. The cross-section of the orifice is adjusted during the beginning of an operation to yield a gauge pressure such that the heat generated by the collision impacts of the starch granules is sufficient automatically to supply the heat required for gelatinization. This should be at least a pressure of the order of 200 pounds per square inch, and preferably not less than about 300 pounds per square inch. It will be obvious that the pressure may be varied over a wide range, depending upon the particular starch selected and upon the limits of the processing apparatus utilized.

The opening of the orifice thereafter is permitted to remain in the initial position but the gauge pressure will increase as the result of an increase in the viscosity of the starch solution as it undergoes gelatinization. The heat generated by the rapid pumping of the starch solution at high pressures slowly increases the temperature of the mass. When a temperature has been attained approximating the gelatinization temperature of the starch, the granules begin progressively and rapidly to swell or hydrate, in accordance with well-recognized facts of starch behavior. It is well known that gelatinization does not take place instantly at a fixed temperature but proceeds gradually through a temperature range. Apparently some of the starch micelles gelatinize at a slightly lower temperature than others. The rate of temperature rise also increases, and as is well known, this depends on the rate at which work is done on the starch slurry, and also to some extent on the concentration of solids and pressure, and the insulation in the kettle and pump line. Such increase in temperature correspondingly increases the rate of gelatinization. The gelatinization zone may be technically described as a "semi-rigid" phase, the suspended starch granules being more or less partly swollen or semi-rigid. In this physical condition they have attained their maximum degree of susceptibility to destruction or disorganization through shearing forces induced by the high velocity of turbulent flow. In other words as each starch granule swells its suffers profound attrition during the swelling, but owing to their dispersion in water the local heat generated by the shearing impacts is so reduced or dispersed that degenerative or depolymerizing influences characteristic, for example, of dry grinding are minimized. The fact that the progressively swelling starch granules are rapidly and efficiently disorganized is attested by the observation that the rate and the degree of viscosity increase, at this state, are very much less than with the normal cooking and agitation processes; the consistency of the paste through the gelatinization zone remains relatively fluid.

The rise in temperature might be accelerated by the use of external heating but it has been found that the slower automatic rise in temperature is preferable in order to obtain desired results. It will be apparent, also, that any external preheating may be omitted, if desired, but inasmuch as no material modification of the starch takes place prior to gelatinization, it is preferred to decrease the processing time by such a preheating step.

It is preferred that the rate of heating should not be too rapid, so that the granules will not tend to gelatinize or swell at a faster rate than they can be modified by the physical treatment and the degree or efficiency of the disorganization will be impaired. By permitting the milk of starch to be heated by the action of the pumping means alone, the disorganization process is believed to proceed at maximum efficiency.

For convenience, the term "processing index" (I) is used herein to describe the rapidity with which it is preferred to circulate the starch during gelatinization. If for example the rated pump delivery be P gals./min., and the volume of the batch be B gals., the batch will be circulated P/B times/min. Since the most efficient processing appears to exist in the gelatinization zone, this time of most effective processing (T) multiplied by P/B (the pump/batch ratio) will give approximately the total number of complete circulations of the entire batch, i. e., what may be termed the "processing index" (I). The formula may be expressed:

$$I = T \times \frac{P}{B}$$

where B=batch volume in gals. and P=rated pump capacity in gals. per minute.

For most starches, processing indexes greatly in excess of 20 while promoting dispersions of lower viscosity, appear to yield products less desirable in film-forming properties. In most cases it is not desirable to exceed a processing index of 50. Certain types of starch, however, such as wheat starch, characterized by a gelatinization range extending over a relatively wide temperature range, must perforce suffer a considerably higher processing index than starches having the normally narrow gelatinization range. For tapioca, potato, or corn starches, an index of approximately 15 to 25, determined as outlined above, seems preferable.

After the milk of starch has become completely gelatinized and disorganized by subjecting it to the process described, it may be dried in any conventional manner such as, for example, by spray or drum drying. The product resembles sugar in appearance and has the property of going directly into solution in cold water.

A more specific example of the method of the invention may be considered in connection with the diagrammatic showing in Fig. 1. In accordance with this example, 50 gallons of a starch milk is made by adding 54 pounds of potato starch to 376 pounds of water. The mix is agitated and heated by live steam to 130° F. over a period of 13 minutes, as shown at $a$. The orifice was adjusted to give an initial pressure of 300 pounds per square inch, as shown at $a'$. The steam is then shut-off and pumping started at 40 gals. per minute, the "milk" of starch being continuously circulated. Processing is now entirely automatic over a subsequent period of 47 minutes, as shown at $c$, no attention being required save to note the lapse of time required for the optimum "processing index"—in this example 25 minutes from the time the pressure starts to rise above the initial pressure, as shown at $b$. The pressure increased to about 630 lbs. per square inch, as shown at $e$, in about 18 minutes from the time the pressure started to rise ($b$) and fell to about 600 lbs. per square inch at the end of the processing period, as shown at $f$. The temperature rose to about 168° F. at the end of the treatment, as shown at $g$. At the close of this last period ($b$—$c$) of 25 minutes (60 minutes in all), pumping is stopped and the kettle discharged. The processing index was $$25 \times \frac{40}{50} = 20$$

The fluid, homogeneous starch dispersion is now ready for commercial application of sizing or coating, or may be stored for subsequent use.

A similar process can be carried out with potato, tapioca or corn starch in a concentration preferably of about 10 to 15% solids with the same apparatus at about the same processing index. The maximum degree of desirable characteristics is obtained in concentrations of this order.

The process of this invention may be applied to starch of any source. When applied to different starches the factors will vary depending on the starch. For example, wheat starch, which has a higher gelatinizing temperature may be preheated to a higher degree and may require a high processing index, preferably at least 40.

The unusual stability of concentrated dispersions of the new starch product prepared in accordance with this invention is believed to be unique, both in respect to a wide range of temperature variations and to aging.

In order to show the novel viscosity characteristics of the starch prepared in accordance with the invention and to demonstrate the manner in which it distinguishes from the starches known to the prior art, it is convenient to consider the viscosity characteristics of a dispersion of the starch at different temperatures.

If the logarithm of the kinematic viscosity of any solution is plotted against the reciprocal of the absolute temperature, a line or curve will be obtained which is indicative of the viscosity properties of the liquid over the temperature range under consideration. In a so-called "ideal" fluid the relationship of the logarithm of the kinematic viscosity to the reciprocal of absolute temperature will be linear. Pure water approaches this linear relationship.

If a solution of a tapioca or cassava starch prepared in accordance with the invention, having a concentration of 10% of solids, has its kinematic viscosity in centistokes determined by means of a suitable viscosimeter between the ranges of 10° C. and 80° C., and the logarithms of these viscosity values plotted against the reciprocal of the absolute temperatures, the relationship will approach the linear, as shown at 1 in Fig. 2. This indicates a remarkable degree of homogeneity and stability of liquid structure.

If a 5% aqueous dispersion of tapioca or cassava starch processed or disorganized by normal methods of cooking, has its kinematic viscosity determined and similarly plotted with respect to absolute temperature, the relationship does not remotely approach the linear, as shown at 2 in Fig. 2. The percentage rate of change of viscosity is great at both extremes of the temperature range, giving a curve of a sinusoidal form. This is more or less a characteristic of the viscous behavior of the disorganized starches known in the prior art. The curve 2 indicates considerable heterogeneity of liquid structure and pronounced association effects probably through hydrogen bonding. It may also be noted that while the viscosities of the composition shown at 1 and 2 are similar at 80° C., the composition shown at 1 has twice as much solid content as the composition shown at 2.

The novel characteristics of the starch product will also be apparent when it is compared with a so-called "homogenized" starch paste prepared by known processes of long continued agitation or treatment in colloid mills of a substantially gelatinized starch paste. If, for example, a 10% concentration of an aqueous dispersion of tapioca or cassava flour is processed by pumping pre-gelatinized paste through a nozzle for a very long period of time, and the kinematic viscosity determined at temperatures of 10° to 80° C., not only is the viscosity much less than the product of the invention, but when the logarithms of the kinematic viscosity are plotted against reciprocals of absolute temperature, the location and form of the curve may be entirely different, as shown at 3. This form of relationship of viscosity to temperature is in part typical of the so-called "thin-boiling" starches.

Still another variety of degraded starches are those which tend to form a paste or gel upon cooling. In these starches the percentage change of viscosity rises very rapidly at lower temperatures and the logarithm of kinematic viscosity plotted against the reciprocal of absolute temperature deviates pronouncedly from a straight line relationship in the lower temperature ranges.

Thus the viscosity-temperature relationship for the product of the invention is unique and entirely different from the viscosity-temperature relationship of dispersions of starch prepared in accordance with prior art processes within the temperature range of 10° C. and 80° C.

The viscosity stability of the product of the invention is also unique. A 10% concentration of a root starch prepared in accordance with the invention, such as tapioca or potato starch, shows a very reduced tendency to thicken or retrograde upon long standing. This is a very desirable commercial attribute.

The homogeneity of the starch prepared in accordance with the invention as indicated by the viscosity-temperature relationship is reflected by exceptional film-forming properties. Such starch gives dispersions which have the smoothness and fluidity of a soluble dextrine, but nevertheless the exceptional strength and toughness of a protective coating.

Starch prepared in accordance with the invention forms a film which is more cellulosic-like in character than a conventional starch film. Such film-forming properties in starch dispersions are unique and valuable as shown by commercial tests made on paper and textiles.

The product of this invention should be particularly applicable to sizing and coating operations, such as for textile and paper use, owing as heretofore stated, to a unique degree of homogeneity, viscous stability, and the fact that the starch is disorganized or dispersed rather than degenerated.

It will also be understood that the product, whether in the liquid form or dried by suitable methods, may be more or less further converted by familiar processes, such as by amylases, heat and/or chemicals, etc., such conversions having the purpose of modifying it for special industrial usages. Thus, the viscosity for certain purposes such as paper coating, might be reduced by enzyme action or otherwise to the desired degree. It will be understood that such modifications may be carried on either during the process of disorganizing or dissociating the starch as above described, or subsequently to such processing.

It will be apparent that the invention can be the subject of variations which will occur to those skilled in the art and we intend the same to be included so far as they are within the scope of the following claims.

We claim:

1. A method of treating starch comprising forming a slurry of raw starch having a concentration of about 5 to 30% solids, repeatedly pumping the slurry under pressure through a restricted orifice to heat the slurry to a gelatinizing temperature as the starch is subjected to attrition in passing through the orifice.

2. A method of treating starch comprising forming a slurry of raw starch having a concentration of about 5 to 30% solids and pumping the slurry through a restricted orifice, said pumping being carried out to create an initial pressure of at least 300 lbs. per square inch and continuing the pumping to achieve a processing index of not more than 50, said processing index being the time in minutes during which the slurry is pumped after an increase in pressure begins multiplied by the capacity of the pump in gallons per minute and divided by the total volume of the slurry in gallons.

3. A method of forming a novel starch product which comprises preparing a slurry of starch in sufficient water to gelatinize substantially all of the starch, and continuously pumping said slurry under pressure through a restricted orifice during gradual gelatinization of the starch, at least part of said gelatinization being caused by pumping of the slurry under pressure through said restricted orifice.

4. A method of forming a novel starch product comprising forming a starch slurry having a concentration of about 5 to 30% solids, and repeatedly forcing the slurry under pressure through a restricted orifice while the slurry is gradually raised in temperature through the gelatinization zone, at least a part of the increase in temperature being caused by forcing the slurry under pressure through said restricted orifice.

5. A method of treating raw starch comprising pumping a slurry of the starch having 5% to 30% solids through a restricted orifice at an initial temperature below the gelatinization temperature of the starch and at an initial pressure of at least 200 lbs. per square inch, and continuing the pumping until there is no increase in pressure when pumping at constant volume.

6. A method of treating raw starch comprising forming a slurry of the starch having a concentration of about 10 to 20% solids, circulating the slurry through a restricted orifice at an initial temperature below the gelatinization temperature of the starch and at an initial pressure of not less than 300 lbs. per square inch, and continuing the pumping until there is no increase in pressure when pumping at constant volume.

7. A method of treating starch which comprises preparing a slurry of a raw starch in sufficient water to gelatinize substantially all of the starch, raising the temperature of said slurry through gelatinization solely by recirculating said slurry under pressure through a restricted orifice until there is no further increase in viscosity of the resulting dispersion.

8. A method of treating starch comprising initially heating a slurry of raw starch having 5% to 30% solids to below the gelatinization temperature of the starch and thereafter continuing said heating solely by recirculating the starch slurry under pressure through a restricted orifice until substantially all of the starch is gelatinized.

9. A method of treating starch comprising initially heating a slurry of raw starch having 5% to 30% solids to below the gelatinization temperature of the starch and thereafter continuing said heating solely by recirculating the starch slurry under an initial pressure of about 300 lbs. per square inch through a restricted orifice until substantially all of the starch is gelatinized.

GEORGE V. CAESAR.
THOMAS D. THOMPSON.

REFERENCES CITED

The following references are of record in the file of this patent:

UNITED STATES PATENTS

| Number | Name | Date |
|---|---|---|
| Re. 21,057 | Caesar | Apr. 25, 1939 |
| 1,947,295 | Jasga | Feb. 13, 1934 |
| 2,105,052 | Oltmans | Jan. 11, 1938 |
| 1,418,275 | Benjamin | June 6, 1932 |
| 2,214,018 | Gill | Sept. 10, 1940 |
| 2,224,355 | Moller | Dec. 10, 1940 |
| 2,216,179 | Bauer | Oct. 1, 1940 |
| 1,851,749 | Bergquist | Mar. 29, 1932 |
| 2,121,502 | Kassler | June 21, 1938 |
| 2,137,169 | Levey | Nov. 15, 1938 |
| 2,313,574 | Payne | Mar. 9, 1943 |